United States Patent
Duluk, Jr. et al.

(10) Patent No.: US 9,424,201 B2
(45) Date of Patent: Aug. 23, 2016

(54) MIGRATING PAGES OF DIFFERENT SIZES BETWEEN HETEROGENEOUS PROCESSORS

(71) Applicant: NVIDIA CORPORATION, Santa Clara, CA (US)

(72) Inventors: Jerome F. Duluk, Jr., Palo Alto, CA (US); Cameron Buschardt, Round Rock, TX (US); James Leroy Deming, Madison, AL (US); Lucien Dunning, Santa Clara, CA (US); Brian Fahs, Los Altos, CA (US); Mark Hairgrove, San Jose, CA (US); Chenghuan Jia, Fremont, CA (US); John Mashey, Portola Valley, CA (US); James M. Van Dyke, Austin, TX (US)

(73) Assignee: NVIDIA Corporation, Santa Clara, CA (US)

(*) Notice: Subject to any disclaimer, the term of this patent is extended or adjusted under 35 U.S.C. 154(b) by 42 days.

(21) Appl. No.: 14/134,142

(22) Filed: Dec. 19, 2013

(65) Prior Publication Data
US 2014/0281324 A1    Sep. 18, 2014

Related U.S. Application Data

(60) Provisional application No. 61/785,428, filed on Mar. 14, 2013, provisional application No. 61/800,004, filed on Mar. 15, 2013.

(51) Int. Cl.
| | |
|---|---|
| G06F 12/00 | (2006.01) |
| G06F 13/00 | (2006.01) |
| G06F 12/10 | (2016.01) |
| G06F 12/08 | (2016.01) |
| G06F 12/12 | (2016.01) |

(52) U.S. Cl.
CPC ............ *G06F 12/1009* (2013.01); *G06F 12/08* (2013.01); *G06F 12/122* (2013.01); *G06F 2212/652* (2013.01)

(58) Field of Classification Search
None
See application file for complete search history.

(56) References Cited

U.S. PATENT DOCUMENTS

| | | | | |
|---|---|---|---|---|
| 5,475,827 A | * | 12/1995 | Lee | G06F 12/1036 711/207 |
| 9,058,212 B2 | * | 6/2015 | Wang | G06F 9/5016 |
| 2011/0055232 A1 | * | 3/2011 | Graefe | 707/752 |
| 2014/0189217 A1 | * | 7/2014 | Marukame | G06F 3/0679 711/103 |
| 2014/0281364 A1 | * | 9/2014 | Buschardt | G06F 12/1009 711/207 |

OTHER PUBLICATIONS

Talluri et al., Tradeoffs in Supporting Two Page Sizes, Jun. 1992, to appear in the Nineteenth International Symposium on Computer Architecture, pp. 1-5.*

* cited by examiner

*Primary Examiner* — Sean D Rossiter
(74) *Attorney, Agent, or Firm* — Artegis Law Group, LLP

(57) ABSTRACT

One embodiment of the present invention sets forth a computer-implemented method for migrating a memory page from a first memory to a second memory. The method includes determining a first page size supported by the first memory. The method also includes determining a second page size supported by the second memory. The method further includes determining a use history of the memory page based on an entry in a page state directory associated with the memory page. The method also includes migrating the memory page between the first memory and the second memory based on the first page size, the second page size, and the use history.

22 Claims, 7 Drawing Sheets

MIGRATING PAGES OF DIFFERENT SIZES BETWEEN HETEROGENEOUS PROCESSORS

CROSS-REFERENCE TO RELATED APPLICATIONS

This application claims benefit of U.S. provisional patent application Ser. No. 61/785,428, filed Mar. 14, 2013 and titled "Heterogeneous Processors with Different Page Sizes and Migration." This application also claims the priority benefit of the U.S. provisional patent application Ser. No. 61/800,004, filed Mar. 15, 2013 and titled "CPU-To-GPU and GPU-To-GPU Atomics." The subject matter of these related applications is hereby incorporated herein by reference.

BACKGROUND OF THE INVENTION

1. Field of the Invention

The present invention generally relates to computer science and, more specifically, to a migrating pages of different sizes between heterogeneous processors.

2. Description of the Related Art

A typical computer system includes a central processing unit (CPU) and one or more parallel processing units (GPUs). Some advanced computer systems implement a unified virtual memory architecture common to both the CPU and the GPUs. Among other things, the architecture enables the CPU and the GPUs to access a physical memory location using a common (e.g., the same) virtual memory address, regardless of whether the physical memory location is within system memory or memory local to the GPU.

In such unified virtual memory architectures, memory pages may advantageously be sized differently depending on whether the memory pages are stored in memory units associated with the CPU or the GPUs. One drawback to having differently sized memory pages, though, is that migrating the memory pages between those different memory units becomes more complicated. For example, one difficulty that may arise is with migrating a large memory page to a memory unit that only stores small memory pages. In such a situation, the unified virtual memory architecture must decide how to accommodate this discrepancy in page sizes.

As the foregoing illustrates, what is needed in the art is a more effective approach to migrating memory pages of different sizes in systems that implements a unified virtual memory architecture.

SUMMARY OF THE INVENTION

One embodiment of the present invention sets forth a computer-implemented method for migrating a memory page from a first memory to a second memory. The method includes determining a first page size supported by the first memory. The method also includes determining a second page size supported by the second memory. The method further includes determining a use history of the memory page based on an entry in a page state directory associated with the memory page. The method also includes migrating the memory page between the first memory and the second memory based on the first page size, the second page size, and the use history.

One advantage of the disclosed techniques is that memory pages of different sizes can be effectively migrated back and forth between different memory units in a virtual memory architecture. The techniques improve the flexibility of the unified virtual memory system by allowing the unified virtual memory system to function with many different types of memory architectures. Another related advantage is that, by allowing large memory pages to be split into smaller memory pages, and small memory pages to be coalesced into larger memory pages, memory pages having different sizes can be stored in different memory units configured to store different memory page sizes. This feature allows the unified virtual memory system to group pages together when possible, in order to reduce the amount of space occupied in a page table and/or translation lookaside buffer (TLB). The feature also allows memory pages to be split apart and migrated to different memory units when such splitting would improve memory locality and reduce memory access time.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
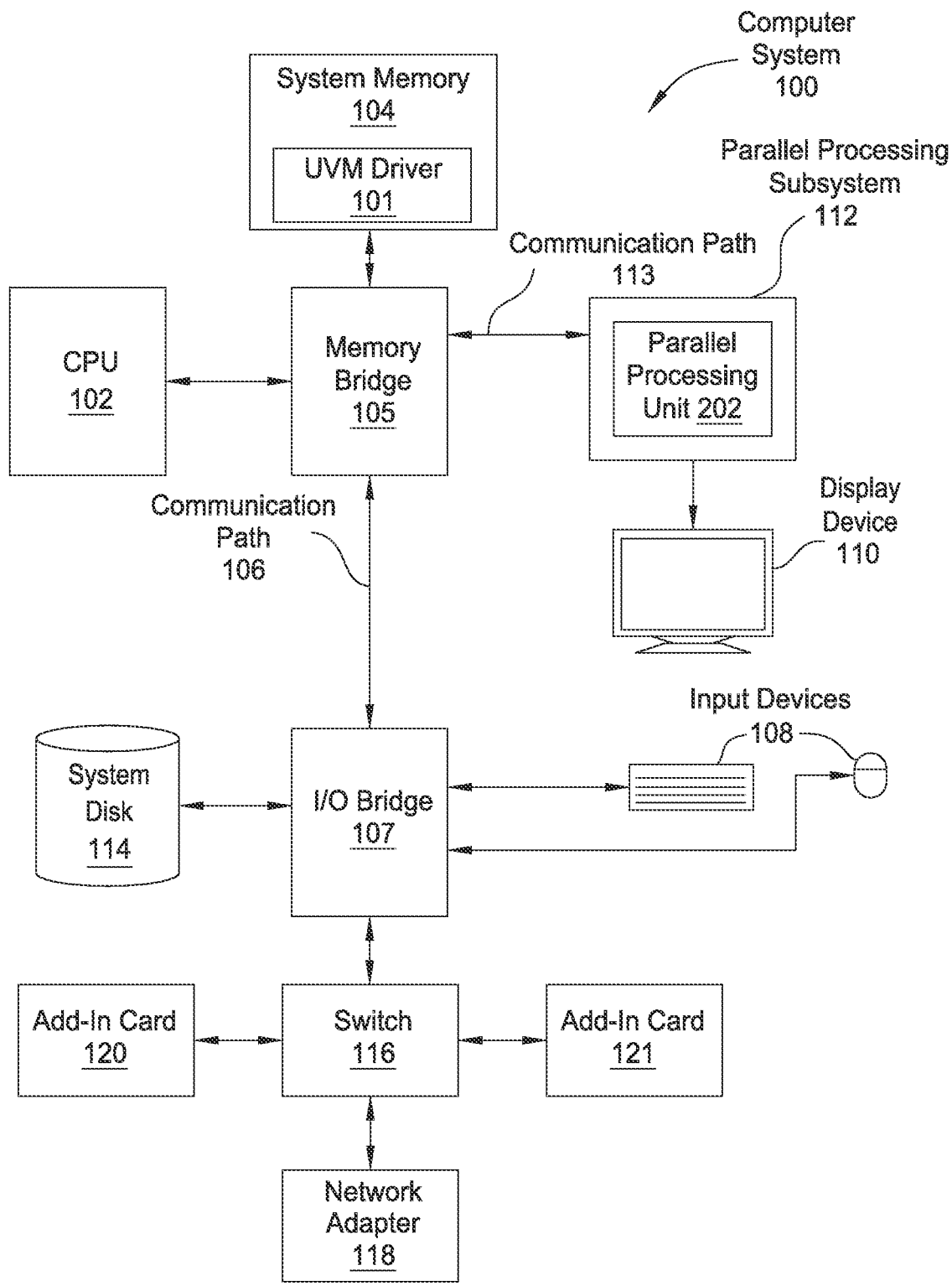
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (GPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread groups. The series of instructions transmitted to a particular GPC constitutes a thread, as previously defined herein, and the collection of a certain number of concurrently executing threads across the parallel processing engines within an SM is referred to herein as a "warp" or "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CTA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202. Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
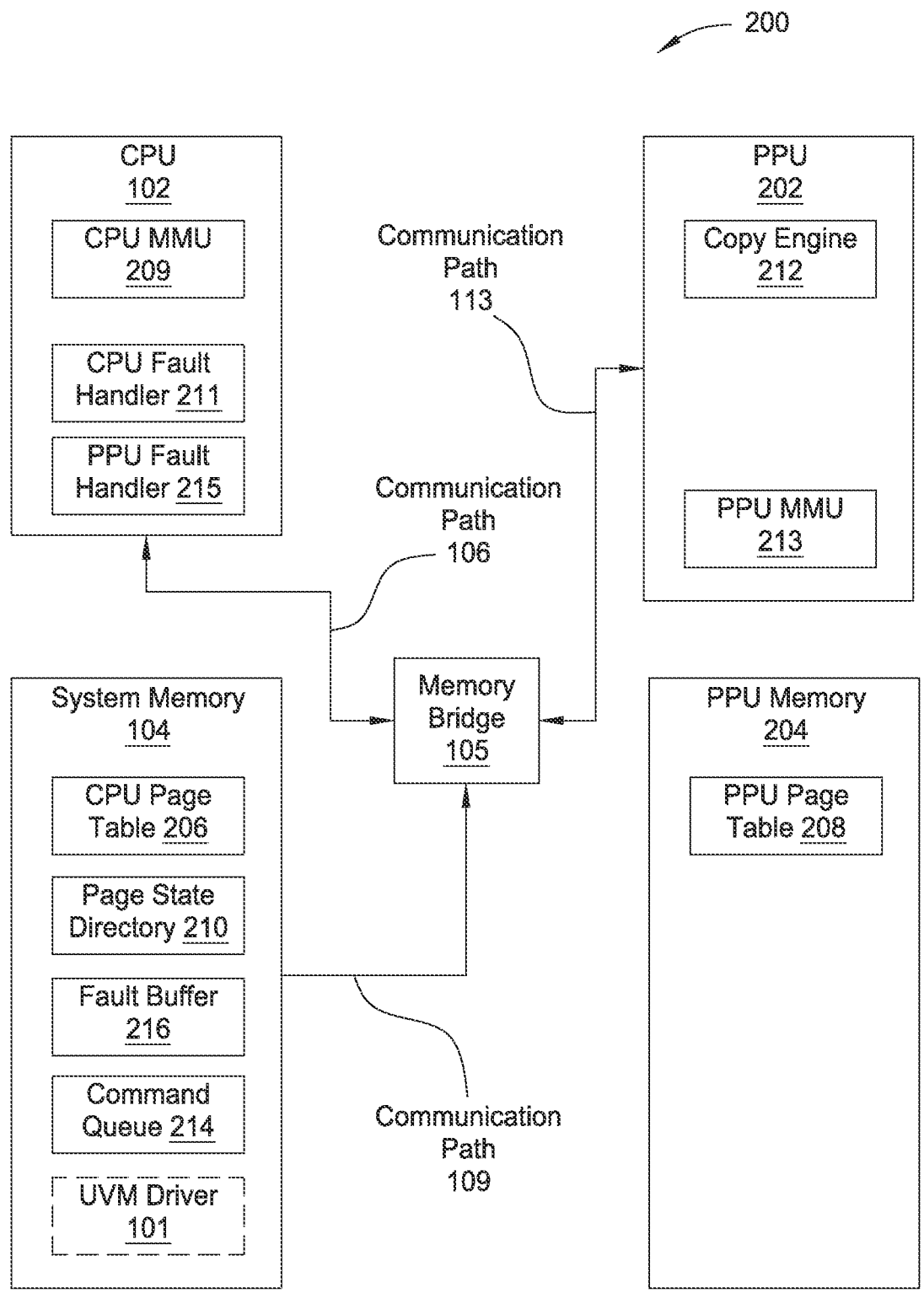
FIG. 2 is a block diagram illustrating a unified virtual memory system (UVM), according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being provoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 210, the fault buffer 216, and one or more command queues 214 may be stored in the PPU memory 204. Further, a PPU page table 208 may be stored in the system memory 104.

In a similar manner as with the CPU 102, the PPU 202 executes instructions that may request data stored in the system memory 104 or the PPU memory 204 via a virtual memory address. The PPU 202 includes a PPU MMU 213, which processes requests from the PPU 202 for translating virtual memory addresses to physical memory addresses. The PPU 202 also includes a copy engine 212, which executes commands stored in the command queue 214 for copying memory pages, modifying data in the PPU page table 208, and other commands. A PPU fault handler 215 executes steps in response to a page fault on the PPU 202. The PPU fault handler 215 can be software running on a processor or dedicated microcontroller in the PPU 202. Alternatively, the PPU fault handler 215 can be combination of software running on the CPU 102 and software running on the dedicated microcontroller in the PPU 202, communicating with each other. In some embodiments, the CPU fault handler 211 and the PPU fault handler 215 can be a unified software program that is invoked by a fault on either the CPU 102 or the PPU 202. The command queue 214 may be in either the PPU memory 204 or the system memory 104, but is preferentially located in the system memory 104.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and memory swizzling type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Translating Virtual Memory Addresses

When a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses may refer to the same data, but may not map to the same physical memory address (e.g., the CPU 102 and the PPU 202 may each have a local read-only copy of the data.)

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the page and then determines the appropriate page fault sequence. The page fault sequence generally maps the memory page associated with the requested virtual memory address or changes the types of accesses permitted (e.g., read access, write access, atomic access). The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned page resides in the PPU memory 204, but can reside in the system memory 104 when migration from the system memory 104 to the PPU memory 204 is not done, generally due to the short-term nature of the PPU ownership. Finally, a memory page is considered CPU-shared if the memory page is stored in the system memory 104 and a mapping to the memory page exists in the PPU page table 208 that allows the PPU 202 to access the memory page in the system memory 104 via a virtual memory address.

The UVM system 200 may assign ownership states to memory pages based on a variety of factors, including the usage history of the memory page. Usage history may include information regarding whether the CPU 102 or the PPU 202 accessed the memory page recently, and how many times such accesses were made. For example, the UVM system 200 may assign an ownership state of "CPU-owned" for a given memory page and locate the page in system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the page in PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:

(a) on the CPU 102 access to an unmapped page that is mapped to the PPU 202, that has not been recently migrated, unmap the faulting page from the PPU 202, migrate the page to the CPU 102, and map the page to the CPU 102;

(b) on the PPU 202 access to an unmapped page that is mapped to the CPU 102, that has not been recently migrated, unmap the faulting page from the CPU 102, migrate the page to the PPU 202, and map the page to the PPU 202;

(c) on the CPU 102 access to an unmapped page that is mapped to the PPU 202, that has been recently migrated, migrate the faulting page to the CPU 102 and map the page on both the CPU 102 and the PPU 202;

(d) on the PPU 102 access to an unmapped page that is mapped on the CPU 102, that has been recently migrated, map the page to both the CPU 102 and the PPU 202;

(e) on the PPU 102 atomic access to page that is mapped to both the CPU 102 and the PPU 202 but not enabled for atomic operations by the PPU 202, unmap the page from the CPU 102, and map to the PPU 202 with atomic operations enabled;

(f) on the PPU 102 write access to page that is mapped on the CPU 102 and PPU 202 as copy-on-write (COW), copy the page to the PPU 202, thereby making independent copies of the page, mapping the new page as read-write on the PPU, and leaving the current page as mapped on the CPU 102;

(g) on the PPU 102 read access to page that is mapped on the CPU 102 and PPU 202 as zero-fill-on-demand (ZFOD), allocate a page of physical memory on the PPU 202 and fill it with zeros, and map that page on the PPU, but change it to unmapped on the CPU 102.

(h) on an access by a first PPU 202(1) to an unmapped page that is mapped on a second PPU 202(2), that has not been recently migrated, unmap the faulting page from the second PPU 202(2), migrate the page to the first PPU 202(1), and map the page to the first PPU 202(1); and (i) on an access by a first PPU 202(1) to an unmapped page that is mapped on a second PPU 202(2), that has been recently migrated, map the faulting page to the first PPU 202(1), and keep the mapping of the page on the second PPU 202(2).

In sum, many heuristic rules are possible, and the scope of the present invention is not limited to these examples.

In addition, any migration heuristic can "round up" to include more pages or a larger page size, for example:

(j) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, and map the pages to the CPU 102 (in more detailed example: for a 4 kB faulted page, migrate the aligned 64 kB region that includes the 4 kB faulted page);

(k) on the PPU 202 access to an unmapped page that is mapped to the CPU 102, that has not been recently migrated, unmap the faulting page, plus additional pages that are adjacent to the faulting page in the virtual address space, from the CPU 102, migrate the pages to the PPU 202, and map the pages to the PPU 202 (in more detailed example: for a 4 kB faulted page, migrate the aligned 64 kB region that includes the 4 kB faulted page);

(l) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, map the pages to the CPU 102, and treat all the migrated pages as one or more larger pages on the CPU 102 (in more detailed example: for a 4 kB faulted page, migrate the aligned 64 kB region that includes the 4 kB faulted page, and treat the aligned 64 kB region as a 64 kB page);

(m) on the PPU 202 access to an unmapped page that is mapped on the CPU 102, that has not been recently migrated, unmap the faulting page, plus additional pages that are adjacent to the faulting page in the virtual address space, from the CPU 102, migrate the pages to the PPU 202, map the pages to the PPU 202, and treat all the migrated pages as one or more larger pages on the PPU 202 (in more detailed example: for a 4 kB faulted page, migrate the aligned 64 kB region that includes the 4 kB faulted page, and treat the aligned 64 kB region as a 64 kB page);

(n) on the access by a first PPU 202(1) to an unmapped page that is mapped to a second PPU 202(2), that has not been recently migrated, unmap the faulting page, plus additional pages that are adjacent to the faulting page in the virtual address space, from the second PPU 202(2), migrate the pages to the first PPU 202(1), and map the pages to the first PPU 202(1); and (o) on an access by a first PPU 202(1) to an unmapped page that is mapped to a second PPU 202(2), that has been recently migrated, map the faulting page, plus additional pages that are adjacent to the faulting page in the virtual address space, to the first PPU 202(1), and keep the mapping of the page on the second PPU 202(2).

In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular page is in the process of being transitioned from CPU-owned to PPU-owned. Various units in the CPU 102 and the PPU 202, such as the CPU fault handler 211 and the PPU fault handler 215, upon determining that a page is in such a transitional state, may forego portions of a page fault sequence to avoid steps in a page fault sequence triggered by a prior virtual memory access to the same virtual memory address. As a specific example, if a page fault results in a page being migrated from the system memory 104 to the PPU memory 204, a different page fault that would cause the same migration is detected and does not cause another page migration. Further, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses.

Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence. Commands executed by the copy engine 212 may include, among other things, deleting, creating, or modifying page table entries in the PPU page table 208, reading or writing data from the system memory 104, and reading or writing data to the PPU memory 204.

The fault buffer 216 stores fault buffer entries that indicate information related to page faults generated by the PPU 202. Fault buffer entries may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry into the fault buffer 216 to inform the PPU fault handler 215 about the faulting page and the type of access that caused the fault. The PPU fault handler 215 then performs actions to remedy the page fault. The fault buffer 216 can store multiple faults because the PPU 202 is executing a plurality of threads, where each thread can cause a one or more faults due the pipelined nature of the memory accesses of the PPU 202.

Page Fault Sequences

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address. After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid page is cached. At this point, the page fault sequence is complete. The ownership state for the memory page is CPU-shared, meaning that the memory page is accessible to both the CPU 102 and the PPU 202. Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the page or the type of memory access, the PPU fault handler 215 determines that a new ownership state for the page is PPU-owned.

The PPU 202 writes a fault buffer entry into fault buffer 216 that indicates that the PPU 202 generated a page fault, and indicates the virtual memory address associated with the page fault. The PPU fault hander 215 executing on the CPU 102 reads the fault buffer entry and, in response, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the page from the system memory 104 into the PPU memory 204. The copy engine 212 in the PPU 202 reads the commands in the command queue 214 and copies the page from the system memory 104 to the PPU memory 204. The PPU 202 writes a page table entry into the PPU page table 208 corresponding to the virtual memory address and associating the virtual memory address with the newly-copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the page or the type of access, the CPU fault handler 211 determines that a new ownership state for the page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the page is CPU-shared, and the memory page has been copied into the system memory 104. The page is accessible to the CPU 102, since the CPU page table 206 includes an entry that associates the virtual memory address with the memory page in the system memory 104. The page is also accessible to the PPU 202, since the PPU page table 208 includes an entry that associates the virtual memory address with the memory page in the system memory 104.

Detailed Example of a Page Fault Sequence

With this context, a detailed description of a page fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread enters a trap, stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to CPU-shared." This state indicates that the page is currently in the process of being transitioned to CPU-shared. When the PPU fault handler 215 runs on a microcontroller in the memory management unit, then two processors will update the PSD 210 asynchronously, using atomic compare-and-swap ("CAS") operations on the PSD 210 to change the state to "transitioning to GPU visible," (CPU-shared).

The PPU 202 updates the PPU page table 208 to associate the virtual address with the memory page. The PPU 202 also invalidates the TLB cache entries. Next, the PPU 202 performs another atomic compare-and-swap operation on the PSD 210 to change the ownership state associated with the memory page to CPU-shared. Finally, the page fault sequence ends, and the thread that requested the data via the virtual memory address resumes execution.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 21.

Migrating Memory Pages of Different Sizes

Memory pages stored in system memory 104 are permitted to have different sizes than memory pages stored in PPU memory 204. For example, memory pages stored in system memory 104 may have sizes of 4 KB, while memory pages stored in PPU memory 204 may have sizes of 128 KB. As another example, memory pages stored in system memory 104 may have sizes of 4 KB, while memory pages stored in PPU memory 204 may have a mixture of 4 KB pages and 128 KB pages. As yet another example, memory pages stored in system memory 104 may have a mixture of 4 KB and 1 MB pages, while memory pages stored in PPU memory 204 may have a mixture of 4 KB pages and 128 KB pages. During a page fault sequence, UVM system 200 may transmit a memory page from one memory unit to another memory unit (for example, from PPU memory 204 to system memory 104). To accommodate differences in the sizes of memory pages, when UVM system 200 transmits a memory page, UVM system 200 may split up a large memory page or combine multiple small memory pages. UVM system 200 may also transmit one or more additional "sibling" memory pages along with the transmitted memory page. In some embodiments, a sibling memory page is a memory page of a smaller size (for example, a memory page have a 4 KB size in a system that stores both 4 KB and 128 KB memory pages) that can contained within an aligned address span of a larger page. An aligned address span refers to the address range, from beginning to end, of a larger sized memory page. Smaller pages that lie within such an address span are considered to be sibling memory pages.

Several operations associated with splitting up a large memory page into multiple smaller memory pages or combining multiple small memory pages into a larger memory page and transmitting these memory pages between memory units are described below with respect to FIGS. 3-7. For example, operations that occur in the following scenarios are described: transmitting a small memory page from system memory 104 to PPU memory 204 (FIG. 3); transmitting a small memory page and sibling memory pages from system memory 104 to a large memory page in PPU memory 204 (FIG. 4); splitting a large memory page in PPU memory 204 into small memory pages, and transmitting one of the small memory pages from PPU memory 204 to system memory 104 (FIG. 5); and transmitting a small memory page and siblings of the small memory page from PPU memory 204 into system memory 104 (FIG. 6).

Figure 3:
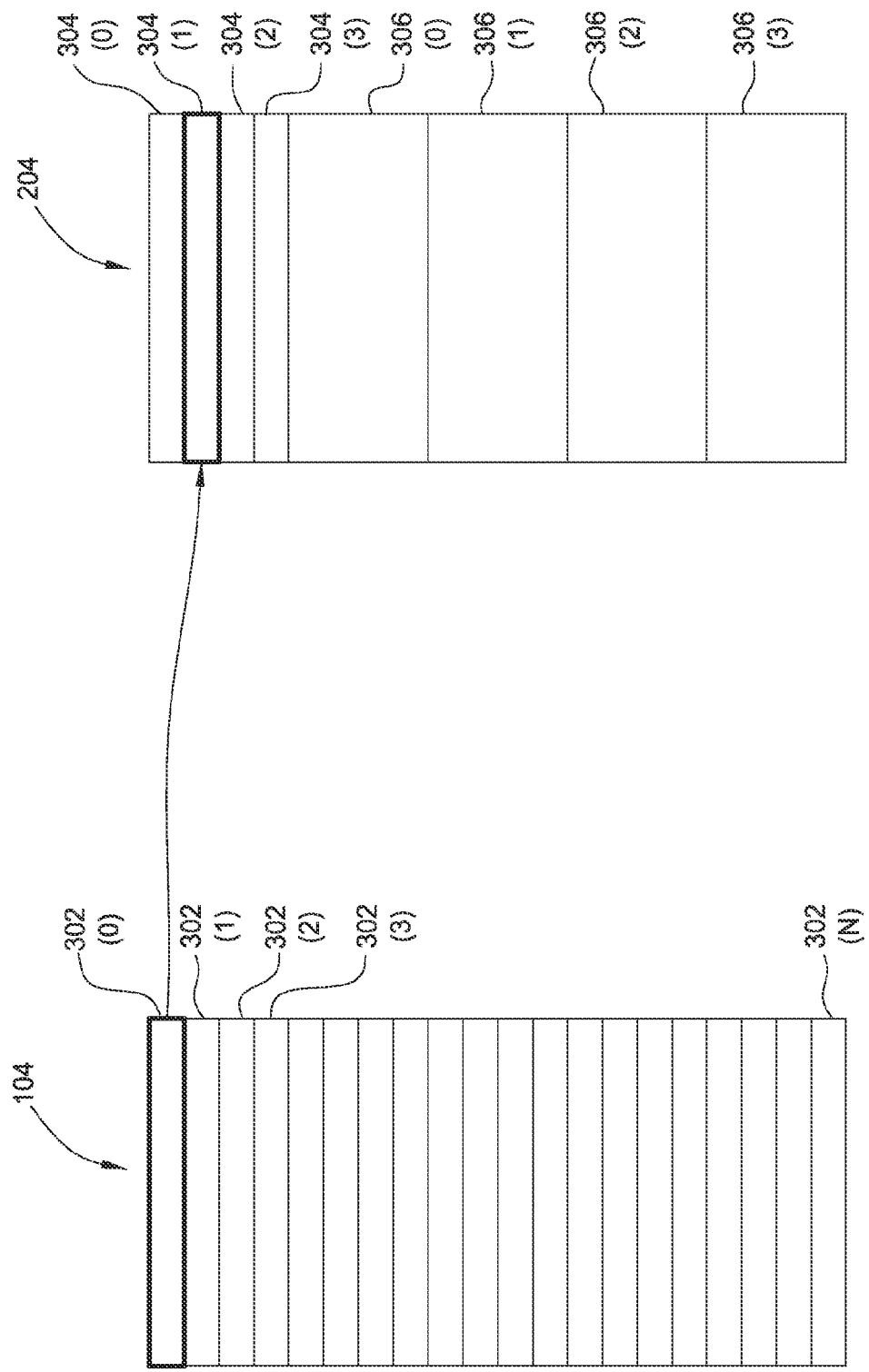
FIG. 3 illustrates an operation for transmitting a small memory page from system memory to PPU memory, according to one embodiment of the present invention.

FIG. 3 illustrates an operation for transmitting a small memory page from system memory 104 to PPU memory 204, according to one embodiment of the present invention. In this operation, system memory 104 stores small memory pages 302 and PPU memory 204 stores both small memory pages 304 and large memory pages 306. According to this operation, UVM driver 101 determines that a particular small memory page 302(0) in system memory 104 is to be migrated to PPU memory 204. As the PPU memory 204 is able to store memory pages of either the small size or the large size, the migrated memory page is stored as small memory page 304(1). The migrated small memory page 304(1) may be stored next to other small memory pages 304 in PPU memory 204. Large memory pages 306 are also stored in PPU memory 204. After the migration, the space in system memory that was occupied by the migrated small memory page 302(0) is deallocated and available for allocation in the future.

The UVM driver 101 alters PSD entries for associated memory pages to perform the operation. Altering the PSD entries may include setting PSD entries to indicate intermediate and/or locked states for associated memory pages. More specifically, the UVM driver 101 sets a PSD entry associated with memory page 302(0) to indicate that memory page 302(0) is in transit and can only be read. Subsequently, the UVM driver 101 sets the PSD entry associated with the destination large memory page 306 to indicate that the large memory page 306 is in transit and cannot be accessed. Then the UVM driver 101 copies the small memory page 302(0) to the destination large memory page 306. Subsequently, the UVM driver 101 sets the PSD entry to indicate that the destination large memory page 306 can be accessed (written to and read from).

As described above with respect to FIG. 2, a particular memory page may be migrated for a wide variety of reasons. The operation depicted in FIG. 3 may be executed when a single small memory page 302 stored in system memory 104 is needed in PPU memory 204, but "sibling" memory pages that surround the single needed memory page still need to be in system memory 104. This situation may happen when the single small memory page 302 is frequently accessed by, for example, PPU 202, while one or more of the sibling memory pages are frequently accessed by, for example, CPU 102. More generally, when a group of memory pages that includes a single small memory page and sibling memory pages is "heavily contended," meaning that various memory pages in the group of memory pages are accessed by different processing units, such as CPU 102 and PPU 202, UVM driver 10 may split up the group of memory pages.

Figure 4:
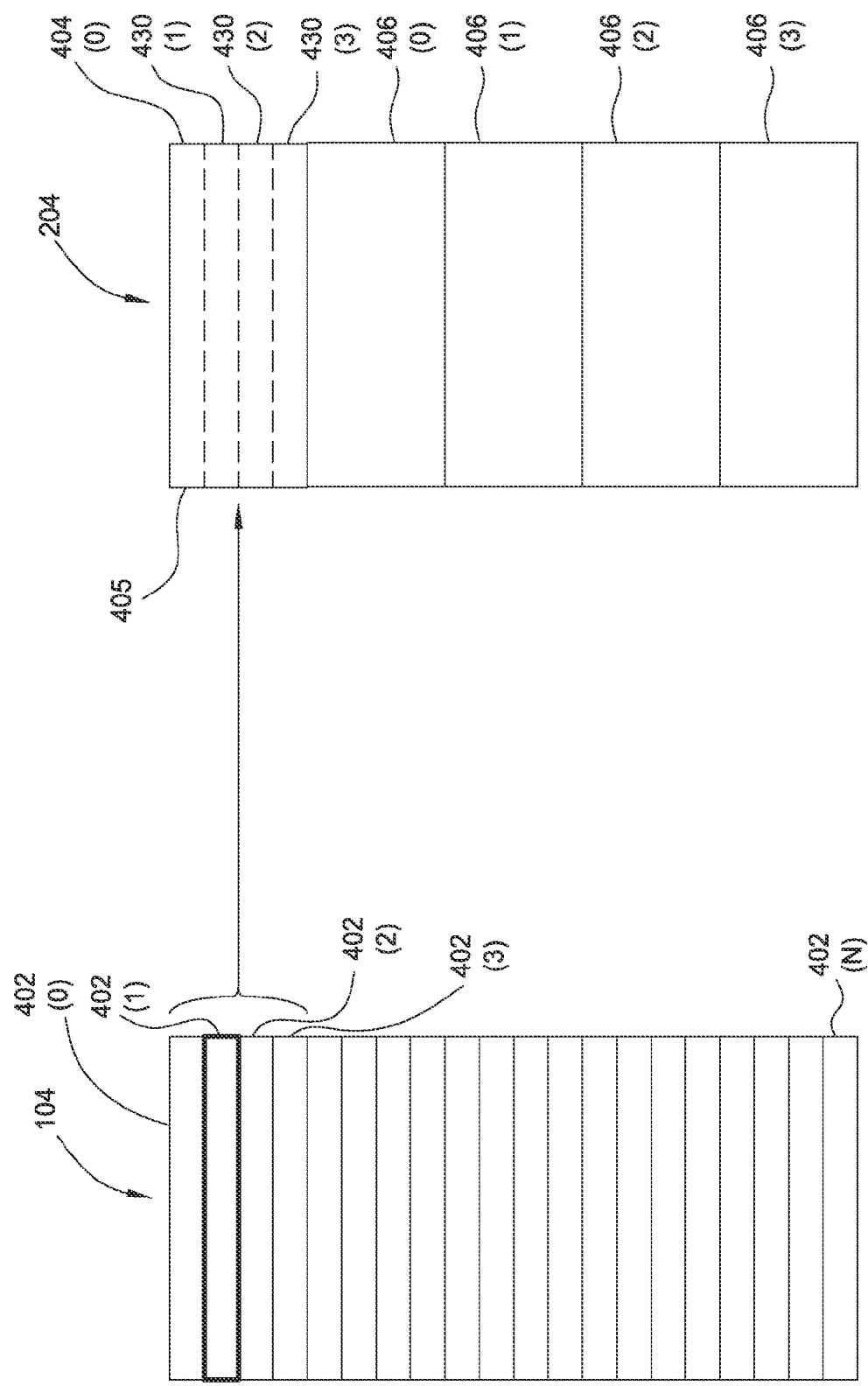
FIG. 4 illustrates an operation for transmitting a small memory page and related "sibling" memory pages from system memory to PPU memory, according to one embodiment of the present invention.

FIG. 4 illustrates an operation for transmitting a small memory page and related "sibling" memory pages from system memory 104 to PPU memory 204, according to one embodiment of the present invention. In this operation, as with the operation described with respect to FIG. 3, system memory 104 stores small memory pages 402 and PPU memory 204 stores both small memory pages 404 and large memory pages 406. According to the operation depicted in FIG. 4, UVM driver 101 determines that a particular small memory page 402(1), as well as sibling memory page 402(0), sibling memory page 402(2), and sibling memory page 402(3) are to be migrated from system memory 104 to PPU memory 204. The UVM driver 101 causes these memory pages to be migrated from the system memory 104 to the PPU memory 204. Because the PPU memory 204 generally functions more efficiently with larger memory pages, the UVM driver 101 may coalesce the small memory pages 402 copied from the system memory 104 into one large coalesced memory page 405 that includes all of the data from the small memory pages.

Again, as described above, both with respect to FIG. 2 and FIG. 3, a particular memory page may be migrated for a wide variety of reasons, such as usage history. The operation depicted in FIG. 4 may be executed when a particular memory page is needed in PPU memory 204, and when moving the sibling memory pages is deemed to be advantageous. In one example, such pages are coalesced based on a least-recently-used tracking scheme. Small pages that not frequently accessed are merged together.

As described above, the UVM driver 101 alters PSD entries for associated memory pages to perform the operation. Altering the PSD entries may include setting PSD entries to indicate intermediate and/or locked states for associated memory pages. More specifically, the UVM driver 101 sets a PSD entry associated with memory page 402(0), memory page 402(1), memory page 402(2), and memory page 402(3) to indicate that these memory pages are in transit and can only be read. Subsequently, the UVM driver 101 sets the PSD entry associated with the destination large memory page 406 to indicate that the large memory page 406 is in transit and cannot be accessed. Then the UVM driver 101 copies the small memory pages to the destination large memory page 406. Subsequently, the UVM driver 101 sets the PSD entry to indicate that the destination large memory page 406 can be accessed (written to and read from).

Figure 5:
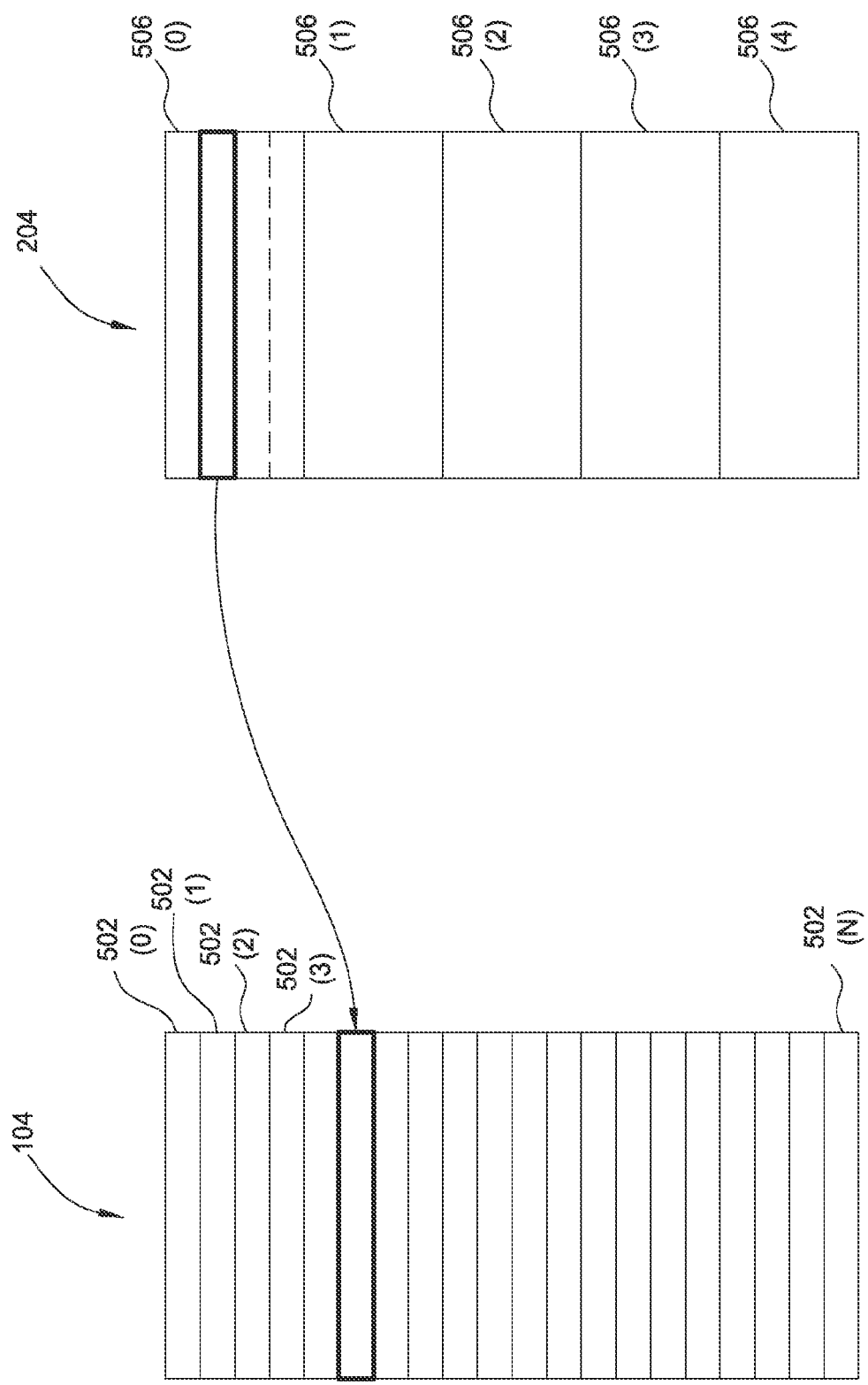
FIG. 5 illustrates an operation for transmitting a small memory page from PPU memory to system memory, according to one embodiment of the present invention.
Figure 6:
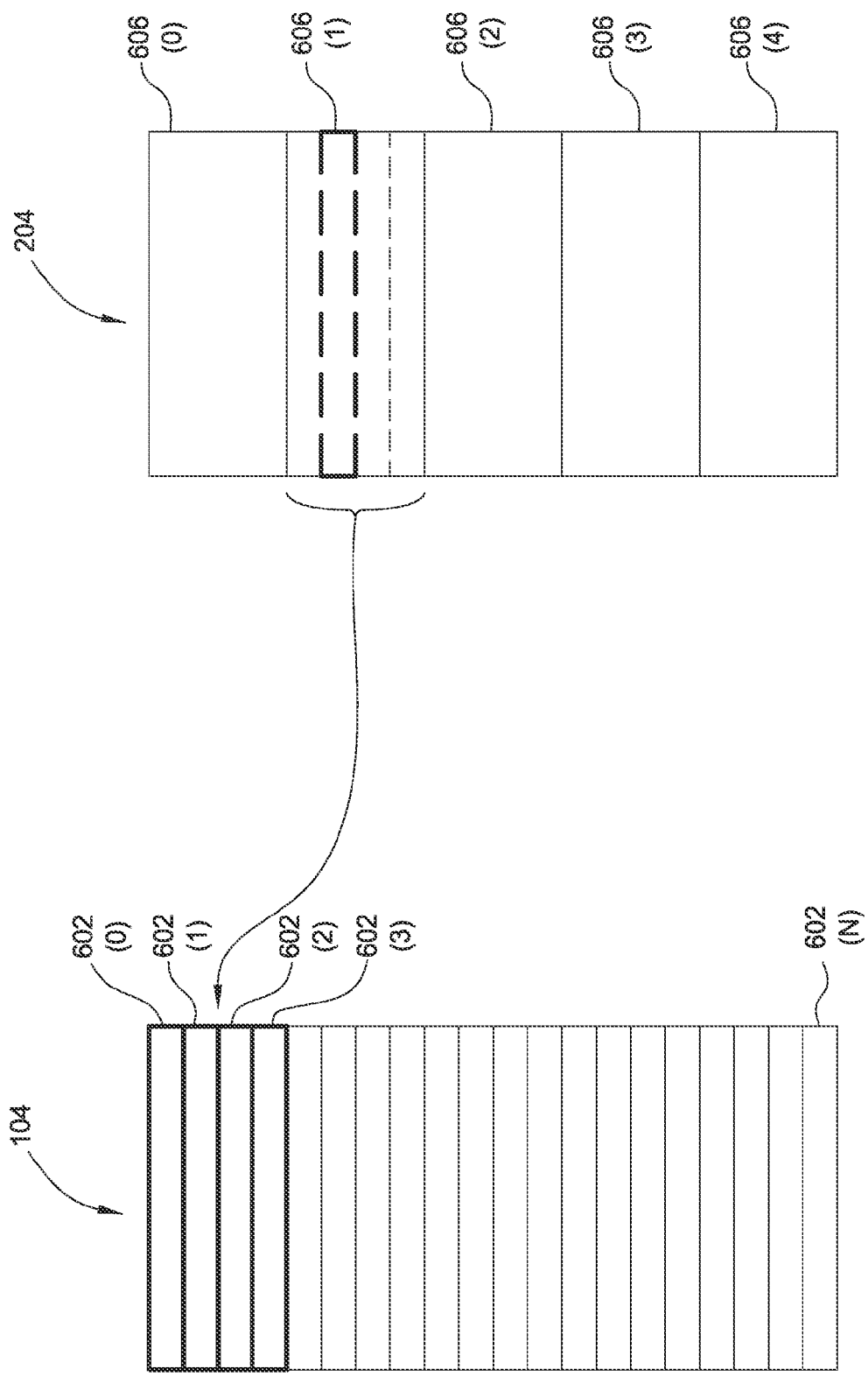
FIG. 6 illustrates an operation for transmitting a small memory page, as well as sibling memory pages, from PPU memory 204 to system memory 104, according to one embodiment of the present invention.

FIG. 5 illustrates an operation for transmitting a small memory page from PPU memory 204 to system memory 104, according to one embodiment of the present invention. In this operation, as with the operations described above with respect to FIGS. 3 and 4, system memory 104 stores small memory pages 502, and PPU memory 204 stores large memory pages 504 and small memory pages 506. According to this operation, UVM driver 101 determines that a particular portion of a large memory page stored in the PPU memory 204 is to be migrated to system memory 104. UVM driver 101 causes the large memory page to be broken up into small memory pages, and then causes the small memory page associated with that portion to be migrated to system memory 104. Again, a particular memory page may be migrated for a wide variety of reasons, including usage history, as described above.

As described above, memory pages that are "heavily contended" may be split. In other words, for a particular large memory page, if the small memory pages within the large memory page are frequently accessed by multiple different processing units, such as CPU 102, or PPU 202, then that large memory page may be split. This analysis is a type of analysis that is based on usage history.

As described above, the UVM driver 101 alters PSD entries for associated memory pages to perform the operation depicted in FIG. 5. More specifically, the UVM driver 101 sets a PSD entry associated with the large memory page to be split up to indicate that this memory page is in transit and can only be read. Subsequently, the UVM driver 101 sets the PSD entry associated with the destination small memory page 502 to indicate that the small memory page 502 is in transit and cannot be accessed. Then the UVM driver 101 copies the portion of the large memory page 506 to the destination small memory page 502. Subsequently, the UVM driver 101 sets the PSD entry to indicate that the destination small memory page 502 can be accessed (written to and read from).

FIG. 6 illustrates an operation for transmitting a small memory page, as well as sibling memory pages, from PPU memory 204 to system memory 104, according to one embodiment of the present invention. In this operation, as with the operations described above with respect to FIGS. 3-5, system memory 104 stores small memory pages 602, and PPU memory 204 stores large memory pages 604 and small memory pages 606. According to this operation, UVM driver 101 determines that a particular portion of a large memory page 606 is to be migrated from PPU memory 204 to system memory 104. The UVM driver 101 causes the large memory page 606 to be split up into small memory pages 604, and causes small memory page 604(1) as well as the siblings—small memory page 604(0), small memory page 604(2), and small memory page 604(3)—to be migrated to system memory 104. As with FIGS. 3-5, a particular memory page such as small memory page 604(1) may be migrated from PPU memory 204 to system memory 104 for a variety of reasons, as described above with respect to FIGS. 1 and 2.

As also described above, the UVM driver 101 alters PSD entries for associated memory pages to perform the operation. More specifically, the UVM driver 101 sets a PSD entry associated with the large memory page to be split up to indicate that this memory page is in transit and can only be read. Subsequently, the UVM driver 101 sets the PSD entry associated with the destination small memory pages 602 to indicate that the small memory pages 602 are in transit and cannot be accessed. Then the UVM driver 101 copies the large memory page 606, now broken into small memory pages, to the destination small memory pages 602. Subsequently, the UVM driver 101 sets the PSD entry to indicate that the destination small memory pages 602 can be accessed (written to and read from).

Figure 7:
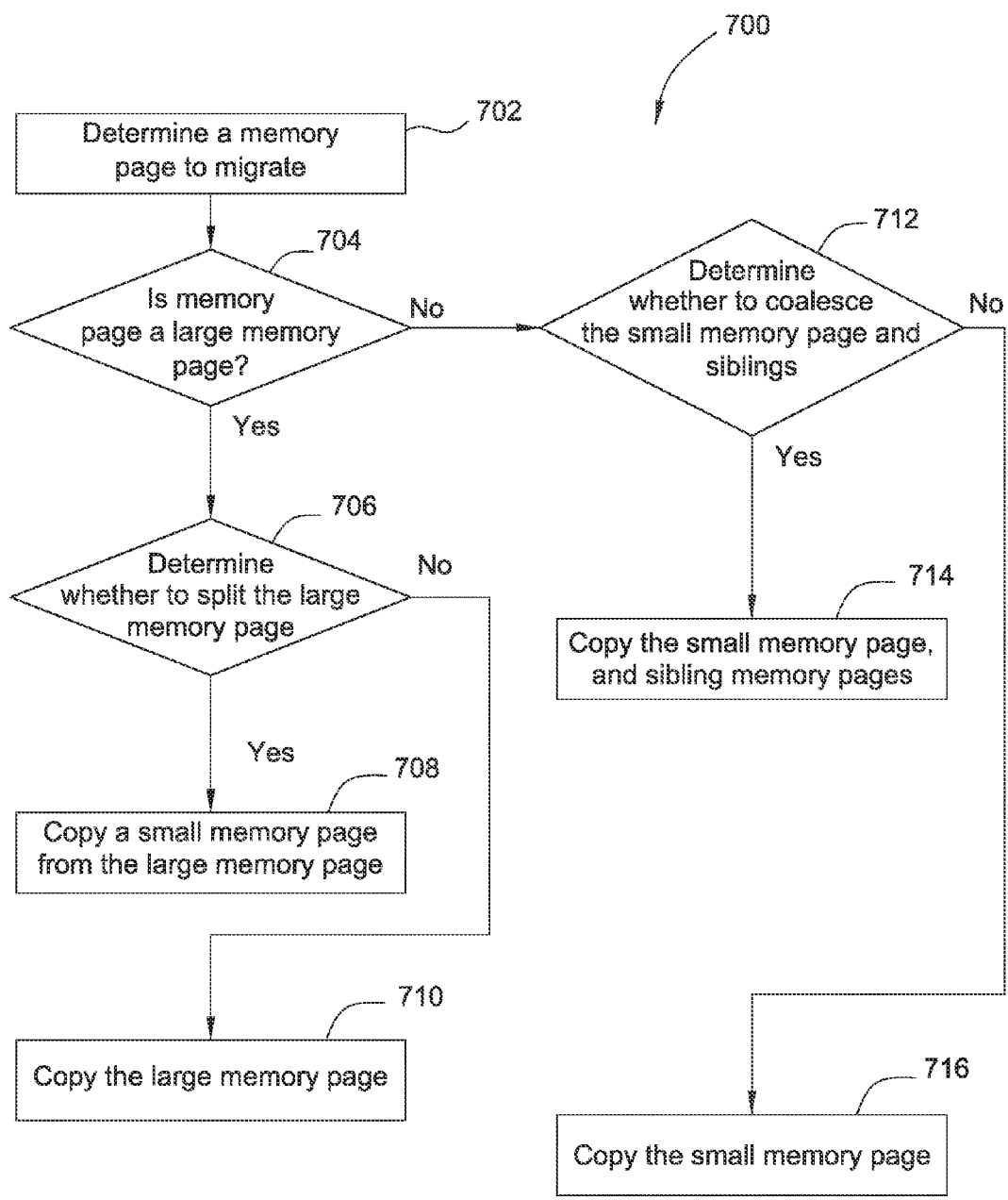
FIG. 7 is a flow diagram of method steps for migrating memory pages of different sizes between memory units in a virtual memory architecture, according to one embodiment of the present invention.

FIG. 7 is a flow diagram of method steps for migrating memory pages of different sizes between memory units in a virtual memory architecture, according to one embodiment of the present invention. Although the method steps are described in conjunction with FIGS. 1-6, persons skilled in the art will understand that any system configured to perform the method steps, in any order, falls within the scope of the present invention.

As shown, a method 700 begins at step 702, where the UVM driver 101 determines a memory page to migrate. At step 704, the UVM driver 101 determines whether the memory page is a large memory page. If the memory page is a large memory page, then the method 700 proceeds to step 706. At step 706, the UVM driver 101 determines whether to split the large memory page. If the UVM driver 101 determines that the large memory page should be split, then the method proceeds to step 708. In step 708, the UVM driver 101 splits the large memory page and copies a small memory page from the large memory page from one memory unit to another memory unit. If in step 708, the UVM driver 101 determines not to split the large memory page, then the method proceeds to step 710. At step 710, the UVM driver 101 copies the large memory page from one memory unit to another memory unit.

Returning to step 704, if the UVM driver 101 determines that the memory page is not a large memory page, then the memory page is a small memory page and the method proceeds to step 712. At step 712, the UVM driver 101 determines whether to coalesce the small memory page and siblings. If the UVM driver 101 determines that the small memory page should be coalesced, then the UVM driver 101 proceeds to step 714. In step 714, the UVM driver 101 copies the small memory page and sibling memory pages from one memory unit to another memory unit. If in step 712, the UVM driver 101 determines not to coalesce the memory page and siblings, then the method proceeds to step 716. At step 716, the UVM driver 101 copies the small memory page from one memory unit to another memory unit.

In sum, an approach is provided whereby memory pages that are resident in memory units that store different-sized memory pages may be migrated between the different memory units. The UVM driver 101 determines which memory page is to be migrated. If the memory page is a small memory page, then the UVM driver 101 determines whether to also migrate sibling memory pages. If the memory page is a large memory page, then the UVM driver 101 determines whether to split that large memory page up, or whether to migrate the entire memory page. During migration, the UVM driver 101 prevents access to the memory pages that are involved in the migration.

One advantage of the disclosed techniques is that memory pages of different sizes can be effectively migrated back and forth between different memory units in a virtual memory architecture. The techniques improve the flexibility of the unified virtual memory system by allowing the unified virtual memory system to function with many different types of memory architectures. Another related advantage is that, by allowing large memory pages to be split into smaller memory pages, and small memory pages to be coalesced into larger memory pages, memory pages having different sizes can be stored in different memory units configured to store different memory page sizes. This feature allows the unified virtual memory system to group pages together when possible, in order to reduce the amount of space occupied in a page table and/or translation lookaside buffer. The feature also allows memory pages to be split apart and migrated to different memory units when such splitting would improve memory locality and reduce memory access time.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for migrating a memory page from a first memory to a second memory, the method comprising:
   determining a first page size supported by the first memory;
   determining a second page size supported by the second memory;
   determining a use history of the memory page based on an entry in a page state directory (PSD) associated with the memory page, wherein the use history includes a record of recent accesses of the memory page; and
   migrating the memory page between the first memory and the second memory based on the first page size, the second page size, and the use history.

2. The method of claim 1, wherein the first page size is smaller than the second page size, and migrating the memory page comprises transmitting the memory page from a system memory to a memory local to a parallel processing unit (PPU).

3. The method of claim 2, further comprising transmitting at least one sibling memory page from the system memory to the memory local to the PPU, wherein the at least one sibling memory page is to be combined with the memory page to generate at least a portion of a larger memory page in the memory local to the PPU.

4. The method of claim 3, further comprising coalescing an entry in a CPU page table corresponding to the memory page and an entry in the CPU page table corresponding to the at least one sibling memory page to generate an entry in a PPU page table corresponding to the larger memory page.

5. The method of claim 4, wherein coalescing the entry in the CPU page table reduces the amount of space occupied by the memory page in the CPU page table corresponding to the memory page.

6. The method of claim 3, further comprising combining the at least one sibling memory page with the memory page to generate the at least a portion of the large memory page based on an access frequency indicated by the use history of the at least one sibling memory page or the memory page.

7. The method of claim 1, wherein the first size is larger than the second page size, and migrating the memory page comprises transmitting a first memory page from a memory local to a parallel processing unit (PPU) to a system memory.

8. The method of claim 7, wherein migrating the memory page further comprises splitting the memory page in the PPU memory into a plurality of smaller memory pages that includes a second memory page, and transmitting the second memory page from the memory local to the PPU to the system memory.

9. The method of claim 8, further comprising transmitting all of the other pages in the plurality of smaller memory pages from the memory local to the PPU to the system memory.

10. The method of claim 9, further comprising removing an entry from a PPU page table corresponding to the memory page.

11. The method of claim 10, wherein:
    the use history indicates that both a CPU and a PPU have recently accessed data included in the first memory page, and, further comprising:
    splitting the first memory page, and
    transmitting the second memory page from the memory local to the PPU to the system memory.

12. The method of claim 1, wherein the use history further includes a record of the number of recent accesses of the memory page.

13. A non-transitory computer-readable medium storing instructions that, when executed by a processor, cause a computer system to migrate a memory page from a first memory to a second memory, by performing the steps of:
    determining a first page size supported by the first memory;
    determining a second page size supported by the second memory;
    determining a use history of the memory page based on an entry in a page state directory (PSD) associated with the memory page, wherein the use history includes a record of recent accesses of the memory page; and
    migrating the memory page between the first memory and the second memory based on the first page size, the second page size, and the use history.

14. The non-transitory computer-readable medium of claim 13, wherein the first page size is smaller than the second page size, and migrating the memory page comprises transmitting the memory page from a system memory to a memory local to a parallel processing unit (PPU).

15. The non-transitory computer-readable medium of claim 14, wherein the instructions further cause the computer system to transmit at least one sibling memory page from the system memory to the memory local to the PPU, wherein the at least one sibling memory page is to be combined with the memory page to generate at least a portion of a larger memory page in the memory local to the PPU.

16. The non-transitory computer-readable medium of claim 13, wherein the first size is larger than the second page size, and migrating the memory page comprises transmitting a first memory page from a memory local to a parallel processing unit (PPU) to a system memory.

17. The non-transitory computer-readable medium of claim 16, wherein migrating the memory page further comprises splitting the memory page in the PPU memory into a plurality of smaller memory pages that includes a second memory page, and transmitting the second memory page from the memory local to the PPU to the system memory.

18. A computing device for migrating a memory page, the computing device comprising:
    a first memory;
    a second memory;
    a page state directory (PSD); and
    a unified virtual memory (UVM) driver configured to:
        determine a first page size supported by the first memory;
        determine a second page size supported by the second memory;
        determine a use history of the memory page based on an entry in the PSD associated with the memory page, wherein the use history includes a record of recent accesses of the memory page; and
        migrate the memory page between the first memory and the second memory based on the first page size, the second page size, and the use history.

19. The computing device of claim 18, wherein the first page size is smaller than the second page size, and migrating the memory page comprises transmitting the memory page from a system memory to a memory local to a parallel processing unit (PPU).

20. The computing device of claim 19, wherein the UVM driver is further configured to transmit at least one sibling memory page from the system memory to the memory local to the PPU, wherein the at least one sibling memory page is to be combined with the memory page to generate at least a portion of a larger memory page in the memory local to the PPU.

21. The computing device of claim 18, wherein the first size is larger than the second page size, and migrating the memory page comprises transmitting a first memory page from a memory local to a parallel processing unit (PPU) to a system memory.

22. The computing device of claim 21, wherein migrating the memory page further comprises splitting the memory page in the PPU memory into a plurality of smaller memory pages that includes a second memory page, and transmitting the second memory page from the memory local to the PPU to the system memory.

* * * * *